(12) United States Patent
Damm et al.

(10) Patent No.: US 10,344,807 B2
(45) Date of Patent: Jul. 9, 2019

(54) SYNCHRONIZER DEVICE AND SYNCHRONIZATION METHOD

(71) Applicant: HOERBIGER ANTRIEBSTECHNIK HOLDING GMBH, Schongau (DE)

(72) Inventors: Ansgar Damm, Kinsau (DE); Michael Koelzer, Rosshaupten (DE); Andreas Dempfle, Eggenthal (DE); Ottmar Back, Weilheim (DE); Juergen Binder, Schongau (DE)

(73) Assignee: HOERBIGER ANTRIEBSTECHNIK HOLDING GMBH (DE)

( * ) Notice: Subject to any disclaimer, the term of this patent is extended or adjusted under 35 U.S.C. 154(b) by 164 days.

(21) Appl. No.: 15/433,986

(22) Filed: Feb. 15, 2017

(65) Prior Publication Data

US 2017/0234372 A1 Aug. 17, 2017

(30) Foreign Application Priority Data

Feb. 16, 2016 (DE) .................. 10 2016 102 701

(51) Int. Cl.
*F16D 23/06* (2006.01)
*F16D 23/02* (2006.01)

(52) U.S. Cl.
CPC ............. *F16D 23/02* (2013.01); *F16D 23/06* (2013.01); *F16D 2023/0668* (2013.01)

(58) Field of Classification Search
CPC .......... F16D 23/02; F16D 23/04; F16D 23/06; F16D 2023/0656; F16D 2023/0668
See application file for complete search history.

(56) References Cited

U.S. PATENT DOCUMENTS

| 4,181,210 | A | 1/1980 | Bibbens ..................... 192/114 |
| 4,189,041 | A | 2/1980 | Mueller ..................... 192/53 F |
| 5,921,362 | A | 7/1999 | Bailly et al. ............... 192/53.32 |
| 5,960,925 | A | 10/1999 | Helms et al. ................. 192/108 |
| 9,062,720 | B2 | 6/2015 | Binder et al. ........... F16D 11/14 |
| 2007/0281823 | A1 | 12/2007 | Hun .............................. 475/303 |

(Continued)

FOREIGN PATENT DOCUMENTS

| DE | 4224271 A1 | * | 1/1994 | ............. F16D 23/06 |
| DE | 102004041754 | | 3/2006 | ............. F16D 23/04 |

(Continued)

OTHER PUBLICATIONS

European Search Report (w/English summary) issued in application No. 17152665.0, dated Jul. 27, 2017 (14 pgs).

*Primary Examiner* — David R Morris
(74) *Attorney, Agent, or Firm* — Haynes Soloway P.C.

(57) ABSTRACT

Provided is a synchronizer device and method for a manual transmission, having a sliding sleeve which includes an internal toothing having sliding sleeve teeth, a clutch body, the clutch body having an external toothing having a multitude of clutch body teeth for internal toothing of the sliding sleeve to engage therein, and a synchronizer unit. The clutch body teeth at the axial tooth ends adjacent the sliding sleeve and/or at least some of the sliding sleeve teeth at the axial tooth ends adjacent the clutch body each include at least one convex end face which extends in the circumferential direction from a root point adjacent to a tooth flank of the respective tooth via an axially protruding apex portion as far as to a root point adjoining an opposite tooth.

21 Claims, 8 Drawing Sheets

(56) References Cited

U.S. PATENT DOCUMENTS

| | | | |
|---|---|---|---|
| 2011/0167957 A1 | 7/2011 | Kato et al. | ................. 74/665 E |
| 2012/0090941 A1 | 4/2012 | Appelshaeuser et al. | ... 192/53.3 |
| 2014/0020442 A1 | 1/2014 | Menendez-Castanedo et al. | ........ B21D 31/00 |
| 2017/0045095 A1 | 2/2017 | Back et al. | ............. F16D 23/06 |

FOREIGN PATENT DOCUMENTS

| | | | | |
|---|---|---|---|---|
| DE | 102006036795 | 12/2007 | ............ | F16D 23/02 |
| DE | 102009027719 | 1/2011 | ............ | F16D 23/06 |
| DE | 102010048344 | 4/2012 | ............ | F16D 23/06 |
| DE | 102012001836 | 8/2013 | ............ | F16D 23/08 |
| DE | 102014107371 | 11/2015 | ............ | F16D 23/06 |
| DE | 102015006806 | 12/2015 | ............ | F16D 23/06 |
| EP | 0812398 | 12/1997 | ............ | F16D 23/06 |
| EP | 1715210 | 10/2006 | ............ | F16D 23/06 |
| EP | 2123928 | 11/2009 | ............ | F16D 23/06 |
| JP | S53115453 | 10/1978 | ............ | F16D 23/06 |
| JP | S54158558 | 12/1979 | ............ | F16D 11/10 |
| JP | S57174827 | 11/1982 | ............ | F16D 23/06 |
| JP | S5858137 | 4/1983 | ............ | F16D 11/00 |
| JP | S5917369 | 2/1984 | ............ | F16D 23/06 |
| JP | H10159870 | 6/1998 | ............... | B22F 5/08 |
| JP | 2000329159 | 11/2000 | ............ | F16D 23/06 |
| JP | 2003176834 | 6/2003 | ............ | F16D 23/06 |
| JP | 2010133517 | 6/2010 | ............ | F16D 23/06 |
| JP | 2011098679 | 5/2011 | ............... | B60K 6/48 |
| JP | 2014500800 | 1/2014 | ............... | B21J 5/12 |
| JP | 2014098456 | 5/2014 | ............ | F16D 11/00 |
| WO | WO2004005740 | 1/2004 | ............ | F16D 23/06 |
| WO | WO2011054494 | 5/2011 | ............ | F16D 23/06 |
| WO | WO2012028316 | 3/2012 | ............ | F16D 23/06 |
| WO | WO2015180949 | 12/2015 | ............ | F16D 23/06 |

\* cited by examiner

Fig. 1
State of the art

Fig. 2
State of the art

Fig. 3

State of the art

SYNCHRONIZER DEVICE AND SYNCHRONIZATION METHOD

FIELD OF THE INVENTION

The present invention relates to a synchronizer device and a synchronization method for a manual transmission.

BACKGROUND

Locking synchronizers for manual transmissions normally feature a locking geometry for locking the sliding sleeve as long as a differential speed exists between the sliding sleeve and the clutch body of the speed change gear to be shifted. To facilitate slipping in of the sliding sleeve into the clutch toothing of the clutch body, usually a meshing geometry is provided, which is realized by a pointing of both the sliding sleeve teeth and the clutch body teeth.

In modern automated manual transmissions, in particular dual clutch transmissions, efforts are made to reduce the overall axial length.

For this reason, it has already been proposed in WO 2015/180949 A1 that the clutch body teeth be formed without a meshing bevel at their tooth ends axially adjacent to the sliding sleeve. The pointing and the meshing geometry are thus completely dispensed with at least at the toothing of the clutch body. This allows to save on the overall axial length otherwise used for the meshing geometry with its inclined surfaces and pointed tooth ends.

To achieve a reliable slipping in of the sliding sleeve teeth between the clutch body teeth even without the meshing bevels, a speed differential between the sliding sleeve and the clutch body is preferably produced again on completion of the speed synchronization. As a result, the end faces of the sliding sleeve teeth slide along the end faces of the clutch body teeth and, due to the axial shifting force, engage between the clutch body teeth when a tooth space is reached.

It is the object of the invention to further improve a synchronizer device for a manual transmission, which ensures a reliable meshing of the sliding sleeve toothing into the clutch body toothing, accompanied by a small overall axial length and a particularly low circumferential backlash between the sliding sleeve and the clutch body.

SUMMARY

The present invention provides a synchronizer device for a manual transmission, having a sliding sleeve which includes an internal toothing having a multitude of sliding sleeve teeth and is rotatable about a transmission axis, a clutch body of a speed change gear, the clutch body having an external toothing having a multitude of clutch body teeth for the internal toothing of the sliding sleeve to engage therein, and a synchronizer unit which is adapted to block an axial movement of the sliding sleeve, wherein the clutch body teeth at the axial tooth ends thereof adjacent to the sliding sleeve and/or at least some of the sliding sleeve teeth at the axial tooth ends thereof adjacent to the clutch body each include one single convex end face or each include a plurality of convex end faces, wherein the single convex end face or one of the plurality of convex end faces each extends in the circumferential direction from a first root point adjacent to a tooth flank of the respective tooth via an axially protruding apex portion as far as to a second root point, the second root point adjoining an opposite tooth flank of the tooth when there is one single convex end face and being a valley point of an indentation between neighboring convex end faces when there is a plurality of convex end faces, and wherein an axial distance between the apex portion and each of the root points amounts to a maximum of 18%, in particular a maximum of 10%, of a tooth width of the tooth.

In particular, when there is a plurality of convex end faces, exactly two end faces are provided which are located symmetrically to each other, based on a radial section.

In this connection, a convex end face is to be understood to mean a surface which starts from the root points, is curved outwards and extends through the apex portion, in particular the apex, wherein the curve, viewed in the radial direction, is formed by a continuous curvature, a polygonal chain or mixed forms thereof.

In a clutch body tooth having an axial tooth end with a convex shape, at least the first root point of the convex end face is directly adjacent to a tooth flank of the clutch body tooth. In a sliding sleeve tooth that is usually undercut in the area of the axial tooth end and has a tooth end with a convex shape, each root point of the convex end face is also adjacent to a tooth flank, in particular to an undercut portion of the tooth flank of the sliding sleeve tooth. In the case of a plurality of convex end faces (particularly in the case of exactly two convex end faces), the first end face proceeds from the first root point to terminate at a valley point between neighboring convex end faces. For two convex end faces, the valley point is located exactly between the two opposite tooth flanks.

Compared with flat end faces extending perpendicularly to the axial direction, the slightly convex end faces make the meshing of the toothings easier. Further, the stresses on the material as well as signs of wear are also significantly reduced in the transition region between the end face and the tooth flank. In particular, it has been found that when there is a circumferential backlash on the order of that of conventional synchronizer devices having pointed sliding sleeve teeth and clutch body teeth, a reliable meshing of the toothings can already be ensured by having slight curvatures of the convex end face, that is, an axial distance between the apex portion and the root point of about 10% of the tooth width.

According to an embodiment of the synchronizer device, the single convex end face, viewed in the radial direction, is formed to be mirror-symmetrical to the axial tooth centerline. In this way, a reliable and safe meshing is ensured, regardless of the direction of relative rotation between the clutch body and the sliding sleeve. The plurality of axial end faces, viewed in the radial direction, are located in relation to each other so as to be mirror-symmetrical to the axial tooth centerline.

Preferably, the at least one convex end face of the sliding sleeve tooth is designed to be cylindrical.

More particularly, the at least one convex end face, viewed in the radial direction, may be formed by a portion of a lateral surface of a circular cylinder from root point to root point, the radius of the circular cylinder preferably being at least 2 mm. In order to counteract any excessive wear in the transition region between the end face and the tooth flank, any corners or edges that exist in the region of the root point may additionally be rounded or chamfered.

Furthermore, the single convex end face or the plurality of convex end faces may each include an end face portion which extends perpendicularly to the transmission axis or which has a tangent line extending perpendicularly to the transmission axis.

According to a further embodiment of the synchronizer device, an axial dimension of the clutch body teeth amounts to a maximum of 3 mm. In particular, the clutch body may be formed as a clutch disk having a plate thickness of a maximum of 3 mm. When the pointing of the clutch body teeth is omitted, the axial dimension of the clutch body teeth or of the entire clutch disk can be reduced without a reduction in the torque transmission capacity between the sliding sleeve and the clutch body in the shifted condition of the synchronizer device. Especially when the clutch body is configured as a clutch disk, the smaller plate thickness not only allows the overall axial length of the synchronizer device to be reduced, but also material to be saved, which has an advantageous effect on the weight and the costs of the synchronizer device.

Preferably, a circumferential backlash between the sliding sleeve and the clutch body amounts to a maximum of 1 degree, in particular a maximum of 0.25 degrees. Compared to conventional claw toothings having flat end faces of the sliding sleeve teeth and the clutch body teeth that extend perpendicularly to the transmission axis, the circumferential backlash is in this way considerably reduced. Specifically, the circumferential backlash now is on the order of the circumferential backlash of synchronizer devices in which both the sliding sleeve teeth and the clutch body teeth feature a pointing; in contrast to this, again, significant advantages are obtained as to the axial installation space.

According to a further embodiment of the synchronizer device, at least some of the sliding sleeve teeth, at the tooth ends thereof adjacent to the clutch body, include an end face which is flat and extends perpendicularly to the transmission axis. This allows the expenditure for producing the sliding sleeve to be markedly reduced; in this case, preferably all of the clutch body teeth then each include a convex end face as described above at the tooth ends thereof adjacent to the sliding sleeve.

Furthermore, it is possible for the synchronizer device to be force-controlled, the synchronizer unit being formed such that the blocking of the axial movement of the sliding sleeve is overridden when a predetermined maximum force is exceeded. As opposed to conventional synchronizer units, a design of this type allows a force-controlled engagement of the sliding sleeve with the clutch body even if the synchronizer unit has not yet completed the matching of the speeds. In this case, the synchronizer ring is realized without an external toothing to permit the sliding sleeve to move further in the axial direction.

Moreover, the object initially mentioned is also achieved by a synchronizer device, in particular a synchronizer device as described above, having a sliding sleeve which includes an internal toothing having a multitude of sliding sleeve teeth and is rotatable about a transmission axis, a clutch body of a speed change gear, the clutch body having an external toothing having a multitude of clutch body teeth for the internal toothing of the sliding sleeve to engage therein, and a synchronizer unit including a synchronizer ring which has an external toothing having a multitude of synchronizer ring teeth and is adapted to block an axial movement of the sliding sleeve, wherein the internal toothing of the sliding sleeve includes locking teeth each having an axial tooth end that is pointed on both sides in the circumferential direction and meshing teeth each having a blunt axial tooth end, and wherein locking tooth groups of a plurality of locking teeth that are directly adjacent to each other in the circumferential direction and meshing tooth groups of a plurality of meshing teeth that are directly adjacent to each other in the circumferential direction alternate in the circumferential direction.

The meshing teeth having blunt axial tooth ends here allow an axially extremely compact design of the synchronizer device as well as an especially short axial shifting travel of the sliding sleeve between its neutral position and its shifted position. Further, the arrangement of locking tooth groups and meshing tooth groups that alternate in the circumferential direction allows the synchronizer device to withstand especially high stresses. The arrangement in groups in particular allows the surface pressures and stresses on the tooth roots that occur at the synchronizer ring teeth and the locking teeth to be decreased during speed synchronization.

According to an embodiment of the synchronizer device, the synchronizer ring includes, in the circumferential direction, toothed ring segments having synchronizer ring teeth and toothless ring segments without synchronizer ring teeth, each locking tooth group of the sliding sleeve being arranged axially adjacent to a toothed ring segment and each meshing tooth group of the sliding sleeve being arranged axially adjacent to a toothless ring segment. In order to avoid stress peaks during speed synchronization, the synchronizer ring includes as many synchronizer ring teeth as possible; usually, however, toothless ring segments without synchronizer ring teeth are also provided, to form index tabs or stop pieces integrally with the synchronizer ring, for example. These toothless ring segments are now made use of in an advantageous manner for arranging meshing tooth groups of the sliding sleeve in this area. At the same time, locking tooth groups of the sliding sleeve are arranged in the area of the toothed ring segments of the synchronizer ring, so that with an identical tooth pitch of the synchronizer ring and the sliding sleeve, each synchronizer ring tooth continues to rest against a locking tooth of the sliding sleeve during speed synchronization. Owing to the meshing teeth having blunt axial tooth ends, the synchronizer device consequently features an extremely small overall axial length as well as an extremely short axial shifting travel. At the same time, any undesirable stress peaks during speed synchronization are avoided by skillfully arranging the locking teeth and the meshing teeth in groups.

Preferably, the tooth ends of the locking teeth and the tooth ends of the meshing teeth lie substantially in a common plane which extends perpendicularly to the transmission axis. Therefore, any axially projecting catching teeth are not provided and, owing to the speed synchronization by means of the synchronizer ring, they are not necessary for causing the sliding sleeve teeth to mesh between the clutch body teeth.

According to a further embodiment of the synchronizer device, the blunt tooth ends of the meshing teeth include either an end face which is flat and extends perpendicularly to the transmission axis or one single or a plurality of convex end faces, the single convex end face or one of the plurality of convex end faces each extending in the circumferential direction from a first root point adjacent to a tooth flank of the sliding sleeve tooth via an axially protruding apex portion as far as to a second root point, the second root point adjoining an opposite tooth flank of the tooth when there is one single convex end face and being a valley point of an indentation between neighboring convex end faces when there is a plurality of convex end faces, and an axial distance between the apex portion and each of the root points amounting to a maximum of 18%, in particular a maximum of 10%, of a tooth width of the sliding sleeve tooth. Here, the tooth width corresponds to a dimension of the sliding sleeve tooth as measured in the circumferential direction, that is, a tangential dimension thereof.

In addition, the axial tooth ends of the locking teeth that are pointed on both sides in the circumferential direction may include locking bevels which include an angle with the transmission axis that amounts to a maximum of 70 degrees.

According to a further embodiment of the synchronizer device, the internal toothing of the sliding sleeve includes a respective transition tooth between the locking tooth groups and the meshing tooth groups in the circumferential direction, an axial tooth end of each transition tooth being divided approximately in the middle in the circumferential direction and geometrically corresponding to the tooth end of a locking tooth on the side adjacent to the locking tooth group and to the tooth end of a meshing tooth on the side adjacent to the meshing tooth group. In this way, the internal toothing of the sliding sleeve can be made use of especially efficiently for locking against the external toothing of the synchronizer ring and for meshing into the external toothing of the clutch body since each space of the sliding sleeve teeth is clearly associated with a synchronizer ring tooth or a clutch body tooth.

Preferably, the sliding sleeve is a sintered component. The arrangement in groups, alternating in the circumferential direction, of the locking teeth and the meshing teeth that have geometrically differently configured tooth ends is very complicated to realize by forming or shaping methods or machining processes. It is therefore advisable to manufacture the sliding sleeve in the form of a sintered component.

Furthermore, the invention also comprises a manual transmission for a motor vehicle, including a synchronizer device as described above and a transmission controller which includes a first actuator for axially displacing the sliding sleeve and a second actuator for establishing a speed differential between the sliding sleeve and the clutch body.

After a speed synchronization, a certain differential speed can be actively built up again by the second actuator in an advantageous manner in this manual transmission, in order that the sliding sleeve teeth can reliably engage between the clutch body teeth to shift into the desired gear. For actively producing the speed differential, the second actuator may, for example, drive a shaft brake of the transmission, increase a cooling oil flow within the transmission, initiate synchronization of a further speed change gear of the transmission which is not connected to the clutch body for joint rotation therewith, and/or drive an electric motor.

DETAILED DESCRIPTION

Components that largely correspond to each other functionally are denoted by identical reference numbers in the description below, with the reference numbers of components known from the prior art being additionally provided with an apostrophe.

Figure 1:
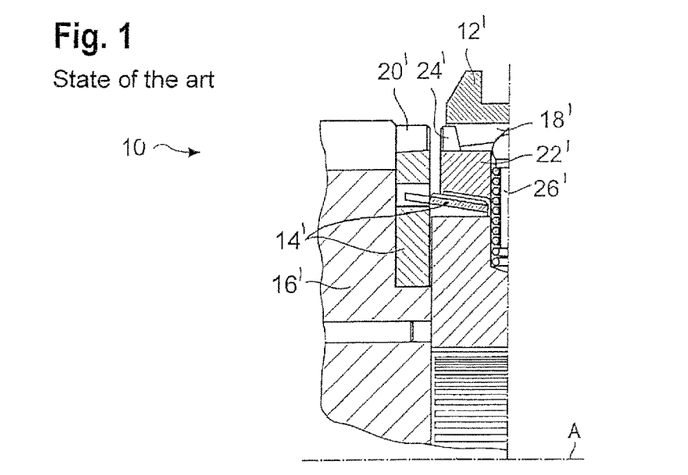
FIG. 1 shows a longitudinal section taken through a conventional synchronizer device of a manual transmission.
Figure 2:
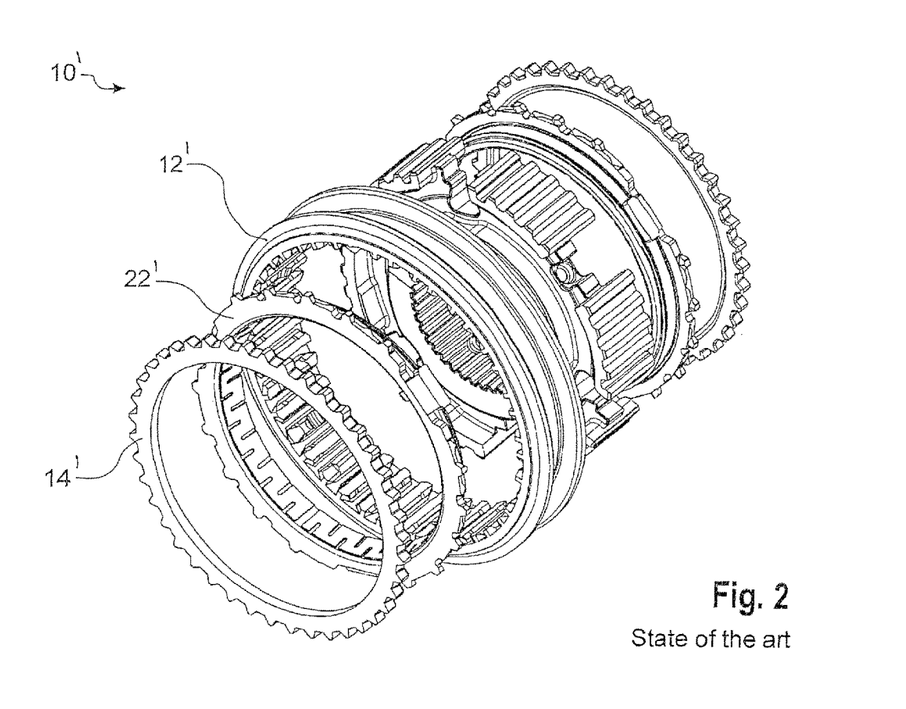
FIG. 2 shows a perspective exploded view of a conventional synchronizer device of a manual transmission.
Figures 3, 7B:
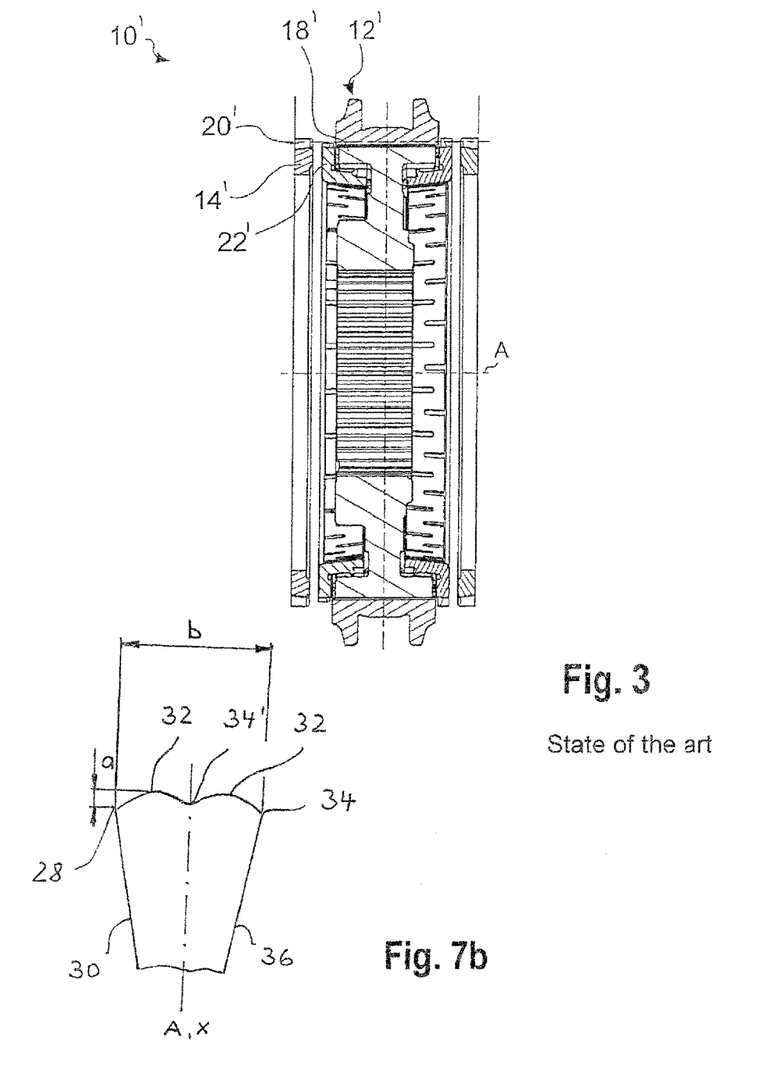
FIG. 3 shows a further longitudinal section taken through a conventional synchronizer device of a manual transmission.
FIG. 7b shows a further variant embodiment of a clutch body tooth as viewed in the radial direction.

FIGS. 1 to 3 show a known synchronizer device 10° of a manual transmission, having a sliding sleeve 12' which is movable along a transmission axis A and rotates jointly with a shaft, not shown in more detail. The synchronizer device 10' further comprises a clutch body 14' which is formed as a clutch disk and is firmly connected with a speed change gear 16' of the manual transmission. The speed change gear 16' is seated on the shaft for rotation as an idler gear and can be connected with the shaft for joint rotation therewith by means of the sliding sleeve 12'.

The sliding sleeve 12' includes an internal toothing having sliding sleeve teeth 18' while the clutch body 14' has an external toothing having clutch body teeth 20'.

For carrying out a speed synchronization and a subsequent meshing process in which the sliding sleeve teeth 18' are meshed into the spaces between the clutch body teeth 20', a synchronizer unit is provided which in a known manner includes a synchronizer ring 22' that includes an external toothing having a multitude of synchronizer ring teeth 24'. A ball that is spring-biased in the radial direction is part of a thrust piece 26' which serves as a pre-synchronizer unit.

Such a synchronizer device 10' operating on the Borg-Warner principle is generally known. At the start of the axial movement of the sliding sleeve 12', the pre-synchronizer unit exerts an axial force on the synchronizer ring 22', the synchronizer ring 22' coming into contact with a friction surface of the clutch body 14' that is configured in two parts in FIG. 1 and in this way being adjusted in the circumferential direction when there is a difference in speed. This causes the synchronizer ring teeth 24' and the sliding sleeve teeth 18' to be positioned relative to each other such that they block an axial movement of the sliding sleeve 12' until there is a matching of the speeds. During speed synchronization, the synchronizer ring teeth 24' block the sliding sleeve 12', so that a meshing of the sliding sleeve teeth 18' between the clutch body teeth 20' is prevented. Only after a speed synchronization can the synchronizer ring 22' be returned in the circumferential direction and allows the meshing of the sliding sleeve teeth 18' between the clutch body teeth 20'.

Figure 4:
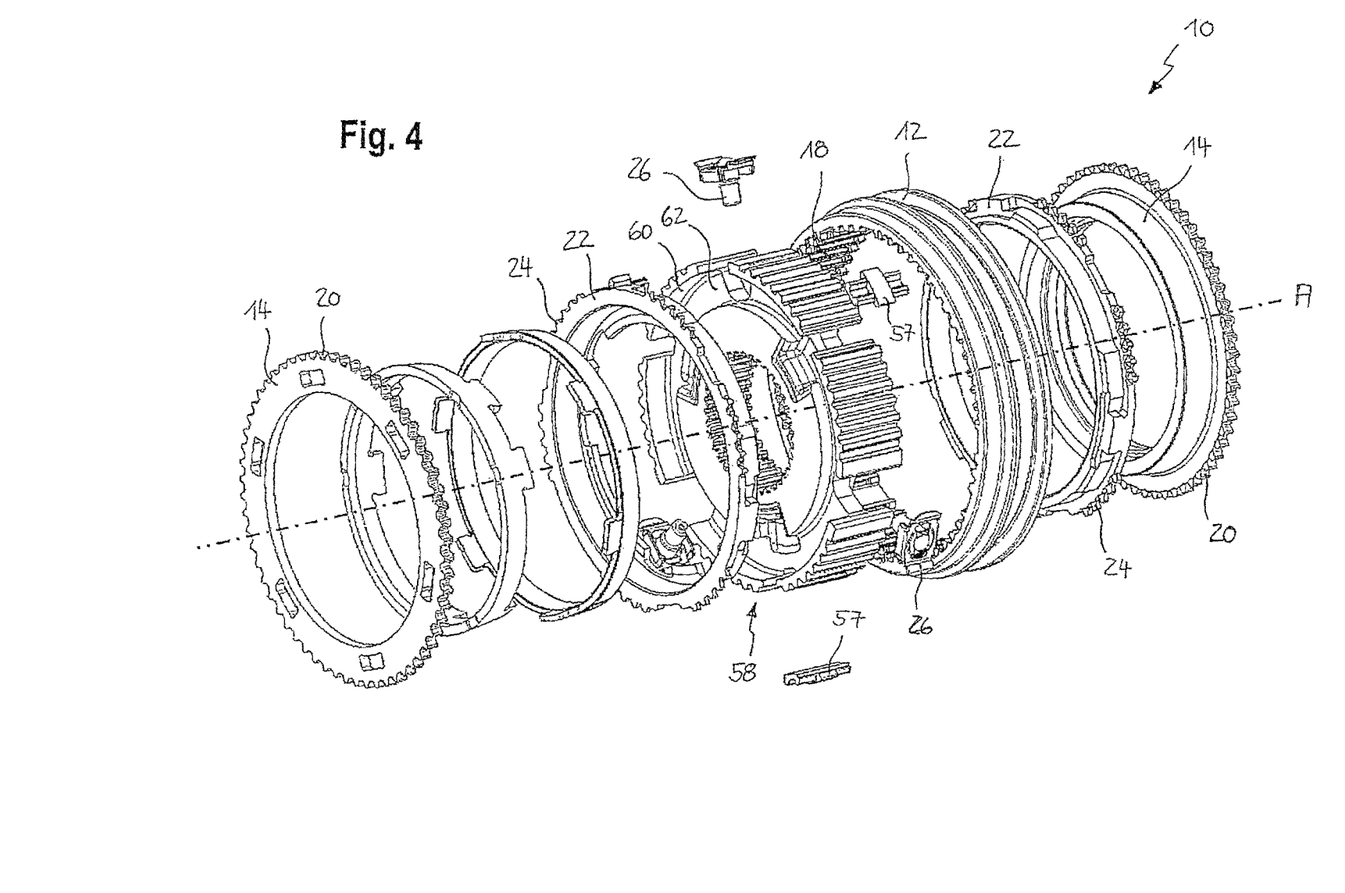
FIG. 4 shows a perspective exploded view of a synchronizer device of a manual transmission according to the invention.

FIG. 4 shows a synchronizer device 10 according to the invention for a manual transmission of a motor vehicle, comprising a sliding sleeve 12 which includes an internal toothing having a multitude of sliding sleeve teeth 18 and is rotatable about a transmission axis A and a clutch body 14 of a speed change gear, the clutch body 14 being configured as a clutch disk and having an external toothing having a multitude of clutch body teeth 20 for engagement therein by the internal toothing of the sliding sleeve 12. The synchronizer device 10 further comprises a synchronizer unit having a synchronizer ring 22 which has an external toothing having a multitude of synchronizer ring teeth 24 and can block an axial movement of the sliding sleeve 12.

The general structure and the operating principle according to Borg-Warner are already generally known from the prior art. In this regard, reference is further made to the above description in relation to FIGS. 1 to 3, and advantageous differences will primarily be discussed below.

To allow a particularly small overall axial length of the synchronizer device 10 involving a short axial shifting travel to be realized, accompanied by a particularly small circumferential backlash between the sliding sleeve 12 and the clutch body 14, the clutch body teeth 20 at the axial tooth ends thereof adjacent to the sliding sleeve 12 and/or at least some of the sliding sleeve teeth 18 at the axial tooth ends thereof adjacent to the clutch body 14 each include a convex end face, the shape of which will be discussed in greater detail further below.

Figure 5:
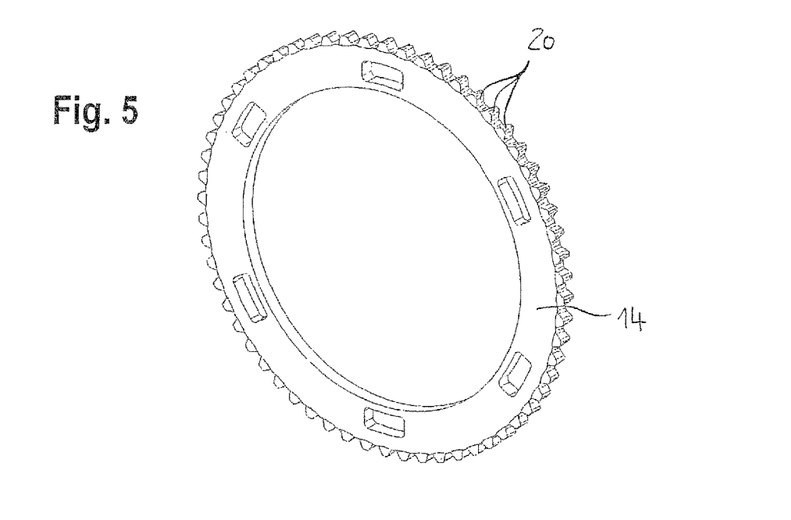
FIG. 5 shows a clutch body of the synchronizer device according to FIG. 4.

FIG. 5 shows a perspective detail view of the clutch body 14 of the synchronizer device 10 according to FIG. 4. It becomes clear as early as in this illustration that the clutch body teeth 20 do not have a conventional, pointed meshing geometry at their axial tooth ends.

Based on the fact that the pointing is omitted, an axial dimension of the clutch body teeth 20 can be reduced and typically amounts to a maximum of 3 mm.

The axial dimension that is required is, of course, dependent on the torque to be transmitted by the clutch body teeth 20, an axial tooth length of 3 mm providing a sufficient torque transmission capacity for commonly used manually operated vehicle transmissions.

In the present exemplary embodiment, the clutch body 14 is specifically in the form of a clutch disk. As a result of the smaller axial dimension of the clutch body teeth 20, the entire axial dimension of the clutch disk can of course also be reduced accordingly to a plate thickness of a maximum of 3 mm. In this way, it is possible to reduce not only the overall axial length, but also the materials required and the weight of the synchronizer device 10 in an advantageous manner.

Figure 6:
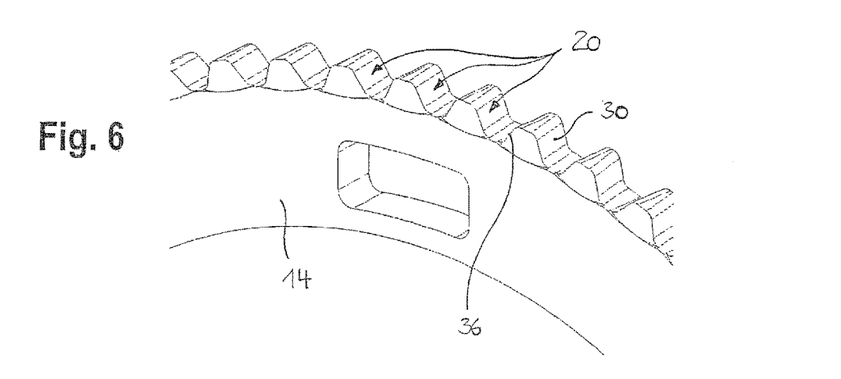
FIG. 6 shows a detail of the clutch body according to FIG. 5.

FIG. 6 shows a detail of the clutch body 14 according to FIG. 5 in the region of the clutch body teeth 20. It can be seen from this illustration that in the present exemplary embodiment each clutch body tooth 20 has a convex end face at its axial tooth end adjacent to the sliding sleeve 12.

Figure 7A:
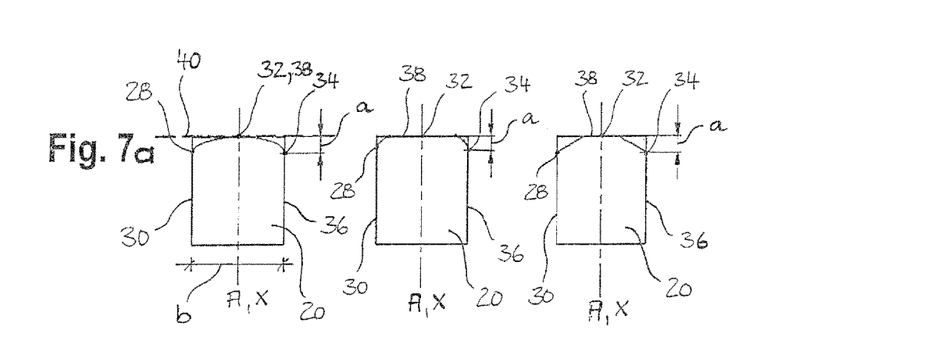
FIG. 7a shows variant embodiments of a clutch body tooth as viewed in the radial direction.

FIGS. 7a and 7b show clutch body teeth 20 viewed in the radial direction, having different variant embodiments of convex end faces; in the embodiments according to FIG. 7a, one single convex end face defines the entire face side, and in FIG. 7b, two convex end faces define the entire face side. In FIG. 7a the singular convex end face each extends in the circumferential direction from a first root point 28 adjacent to a lateral tooth flank 30 of the clutch body tooth 20 via an axially protruding apex portion 32 (in particular an apex), which constitutes the axially foremost point of the tooth 20, as far as to a second root point 34 adjacent to an opposite tooth flank 36 of the clutch body tooth 20. Furthermore, an axial distance a between the apex portion 32 (in particular the apex) and each of the root points 28, 34 amounts to a maximum of 18%, in particular a maximum of 10%, of a tooth width b of the clutch body tooth 20. Here, the tooth width corresponds to a dimension of the clutch body 20 as measured in the circumferential direction, that is, a tangential dimension, and is preferably on the order of about 2 mm.

In connection with the present application, a convex end face generally is to be understood to mean a curved surface which starts from the root points 28, 34, projects axially outwards and extends through the apex portion 32 (in particular the apex), wherein the curve, as viewed in the radial direction, can be formed or approximated by a continuous curvature (see FIG. 7a, left-hand illustration), a polygonal chain (see FIG. 7a, right-hand illustration), or mixed forms thereof (see FIG. 7a, illustration in the middle).

In each of the illustrated exemplary embodiments, the convex end face has a cylindrical shape or, more precisely, is realized as a cylindrical reference surface, but a slight curvature in the radial direction would also be conceivable, so that a surface having a double curvature is obtained.

In each of the variant embodiments of the clutch body teeth 20 as illustrated in FIG. 7a, the singular convex end face, viewed in the radial direction, is formed to be mirror-symmetrical to the axial tooth centerline X. This results in a symmetry in the circumferential direction.

Further, the convex end face each includes an end face portion 38 in the center in the circumferential direction, which extends perpendicularly to the transmission axis A (see FIG. 7a, middle and right-hand illustrations) or which has a tangent line 40 extending perpendicularly to the transmission axis A (see FIG. 7a, left-hand illustration).

More particularly, the convex end face, viewed in the radial direction, may be formed by a portion of a lateral surface of a circular cylinder from the root point 28 to the root point 34, a radius of the circular cylinder amounting to at least 2 mm.

In the embodiment according to FIG. 7b, two adjoining convex end faces 32 are provided. The first (left-hand) end face starts at the first root point 28 already mentioned above and extends as a rounded portion as far as to a second root point 34', which is positioned, e.g., exactly in the tooth centerline X. This root point 38' is the valley point of an indentation between the convex end faces. The second end face 32 (right-hand side) extends from the second root point 38' to the aforementioned root point 34 on the opposite tooth flank. The indentation is a continuously curved convex surface.

The tooth flanks here extend from the middle radially outward away from each other, which may also be the case in the embodiments according to FIG. 7a.

It should be appreciated that with respect to the different shapes of the end faces and the dimensions previously mentioned in connection with the embodiments according to FIG. 7a, in particular the axial distance a between the apex portion 32 (in particular the apex) and each of the root points 28, 34 may also be employed in the variant according to FIG. 7b or the embodiment according to FIG. 7b is correspondingly variable. Depending on the particular boundary conditions, variant embodiments in which the at least one convex end face, viewed in the radial direction, is formed to be nonsymmetrical to the axial tooth centerline X are also alternatively conceivable for the variants according to FIGS. 7a and 7b. In these cases, too, the convex end face or the two convex end faces may include an end face portion 38 extending perpendicularly to the transmission axis A or having a tangent line 40 extending perpendicularly to the transmission axis A, this end face portion 38 then preferably being arranged eccentrically in the circumferential direction with respect to the tooth centerline X.

Figure 8:
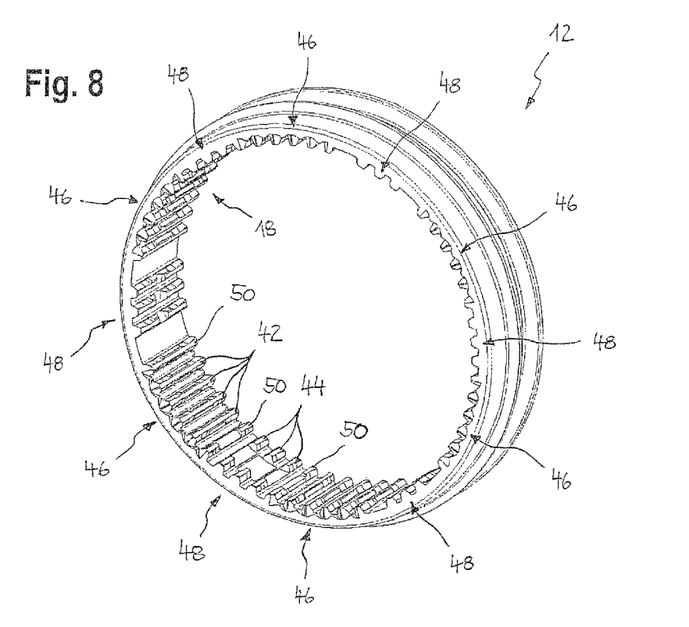
FIG. 8 shows a sliding sleeve of the synchronizer device according to FIG. 4.
Figure 9:
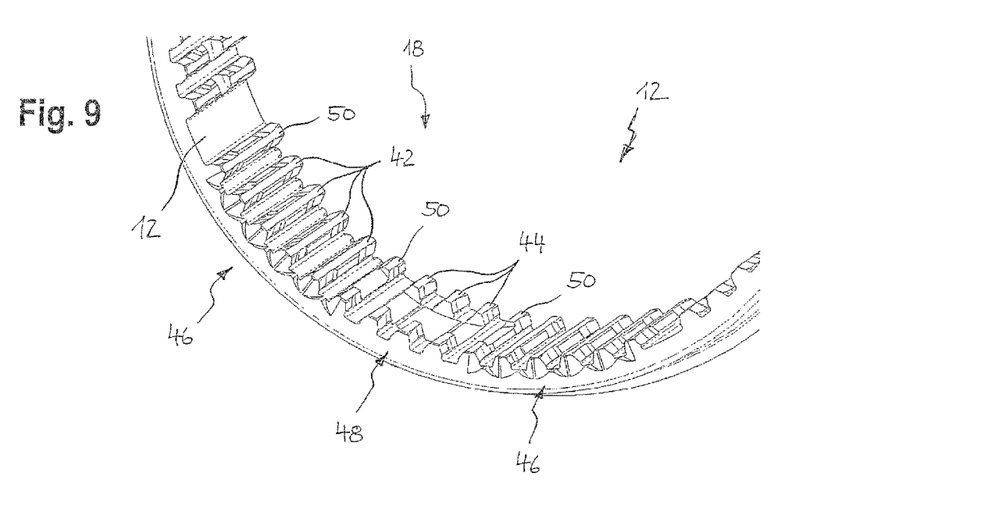
FIG. 9 shows a detail of the sliding sleeve according to FIGS. 8.

FIG. 8 shows a perspective detail view of the sliding sleeve 12 of the synchronizer device 10 according to FIG. 4 while FIG. 9 illustrates a detail in the region of the internal toothing of the sliding sleeve 12.

Here, the internal toothing of the sliding sleeve 12 includes locking teeth 42 having axial tooth ends that are pointed on both sides in the circumferential direction and meshing teeth 44 having blunt axial tooth ends.

With reference to FIGS. 8 and 9 it can further be seen that locking tooth groups 46 each having a plurality of locking teeth 42 that are directly adjacent to each other in the circumferential direction and meshing tooth groups 48 each having a plurality of meshing teeth 44 that are directly adjacent to each other in the circumferential direction alternate in the circumferential direction.

Furthermore, in the illustrated embodiment, the internal toothing of the sliding sleeve 12 includes a respective transition tooth 50 between the locking tooth groups 46 and the meshing tooth groups 48 in the circumferential direction, an axial tooth end of each transition tooth 50 being divided approximately in the middle in the circumferential direction and geometrically corresponding to the tooth end of a locking tooth 42 on the side adjacent to the locking tooth group 46 and corresponding to the tooth end of a meshing tooth 44 on the side adjacent to the meshing tooth group 48.

Due to this arrangement of locking teeth 42, meshing teeth 44 and transition teeth 50 which each have geometrically different tooth ends, a production of the sliding sleeve 12 by cutting or non-cutting shaping processes is fairly involved, so that in the present exemplary embodiment, the sliding sleeve 12 is realized in the form of a sintered component. Generally, however, it is also conceivable to produce the sliding sleeve 12 as a milled part or a formed or shaped part from sheet steel.

The axial tooth ends of the locking teeth 42 and the axial tooth ends of the meshing teeth 44 lie substantially in a common plane E here, which extends perpendicularly to the transmission axis A.

Figure 10:
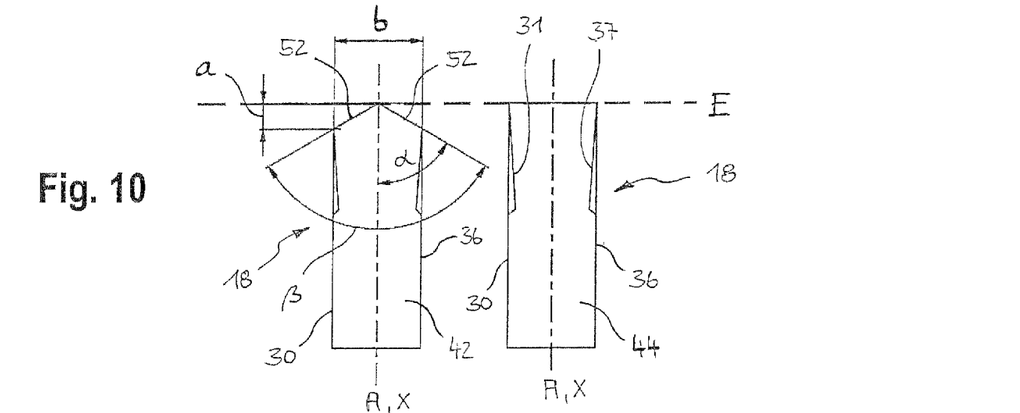
FIG. 10 shows axial end portions of a locking tooth and of a meshing tooth of the sliding sleeve according to FIGS. 8 and 9 as viewed in the radial direction.

This is also indicated in FIG. 10, which illustrates an axial end portion of a locking tooth 42 and of a meshing tooth 44 of the sliding sleeve 12 according to FIGS. 8 and 9 as viewed in the radial direction.

According to FIG. 10, the axial tooth ends of the locking teeth 42 that are pointed on both sides in the circumferential direction include locking bevels 52 which include an angle α amounting to a maximum of 60 degrees with the transmission axis A. The two locking bevels 52 accordingly form a roof shape with a roof angle β, where: β=2α.

Besides, the axial distance between the point of intersection of the two locking bevels 52 and the point of intersection of a locking bevel 52 with an adjacent tooth flank 36 here is distinctly greater than 18% of the tooth width b of the respective sliding sleeve tooth 18.

According to FIG. 10, in contrast to the locking teeth 42, the blunt tooth ends of the meshing teeth 44 have a flat end face which extends perpendicularly to the transmission axis A.

In this simple and completely flat end face configuration of the meshing teeth 44, a small circumferential backlash between the sliding sleeve 12 and the clutch body 14 is possible only because the clutch body teeth 20 have a convex end face, as described above.

Figure 11:
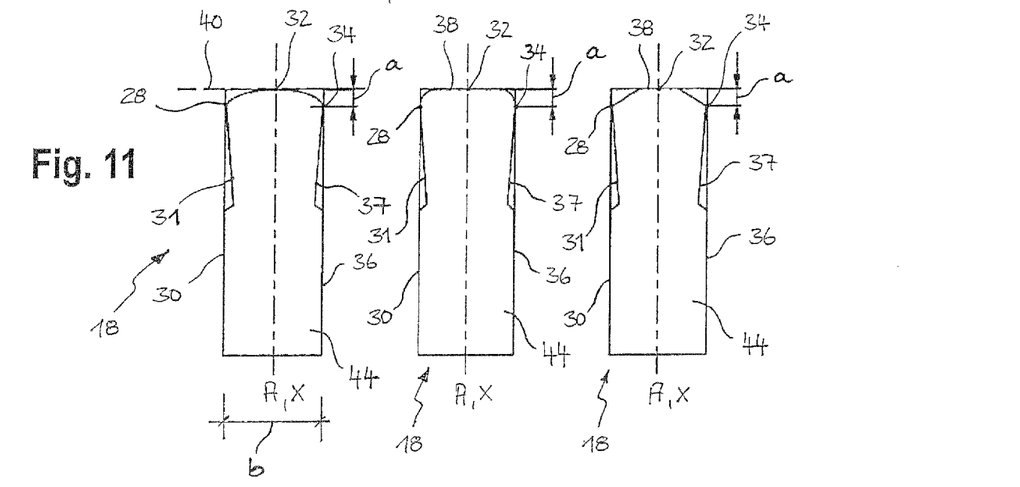
FIG. 11 shows alternative variant embodiments for the axial end portion of a meshing tooth of the sliding sleeve according to FIGS. 8 and 9 as viewed in the radial direction.

FIG. 11 shows alternative variant embodiments for the meshing teeth 44 of the sliding sleeve 12, in which the blunt tooth ends of the meshing teeth 44 each have a convex end face, each convex end face extending in the circumferential direction from a root point 28 adjacent to a tooth flank 30 of the sliding sleeve tooth 18, more specifically adjacent to an undercut portion 31 of the tooth flank 30, via an axially protruding apex portion 32 as far as to a root point 34 adjacent to an opposite tooth flank 36 of the sliding sleeve tooth 18, more specifically adjacent to an undercut portion 37 of the tooth flank 36. Here, the axial distance a between the apex portion 32 and each of the root points 28, 34 amounts to a maximum of 18%, in particular a maximum of 10%, of a tooth width b of the sliding sleeve tooth 18, the tooth width b corresponding to the tangential dimension of the sliding sleeve tooth 18 as measured in the circumferential direction and being on the order of about 2 mm.

The convex contour of the tooth end of a meshing tooth 44 as specified thus corresponds to the convex contour of the tooth end of a clutch body tooth 20 as has already been described on the basis of FIG. 7, so that reference can be made to the above explanations.

Alternatively or additionally to the convexly formed end faces of the clutch body teeth 20 according to FIGS. 7a and 7b, the end faces of the meshing teeth 44 according to FIG. 11 can therefore also have a convex shape. A desirable, that is, a minor circumferential backlash between the sliding sleeve 12 and the clutch body 14 can already be realized if either the tooth ends of the clutch body teeth 20 or the tooth ends of the meshing teeth 44 have a convex end face.

Figure 12:
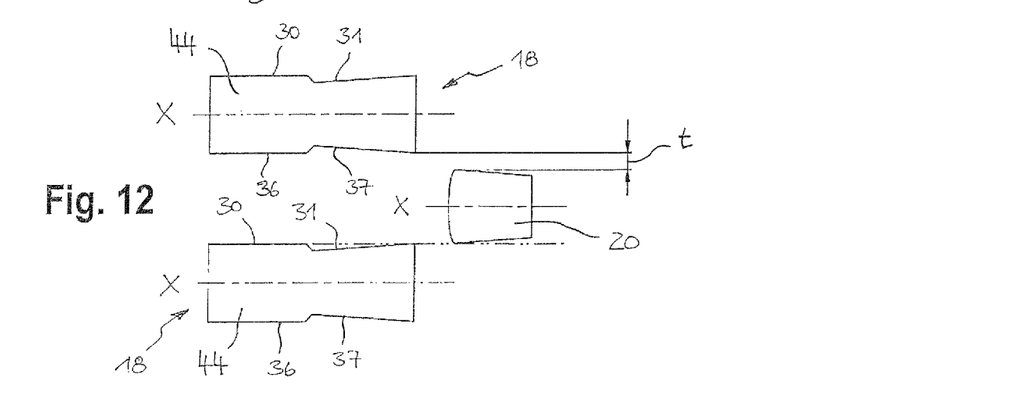
FIG. 12 shows a developed detail view of the sliding sleeve and of the clutch body of the synchronizer device according to the invention for illustrating the circumferential backlash.

If both the tooth ends of the clutch body teeth 20 and the tooth ends of the meshing teeth 44 are formed to have a convex end face, the circumferential backlash can be reduced further in an advantageous manner, even though only to a comparatively small extent. FIG. 12 illustrates the circumferential backlash between the sliding sleeve teeth 18 and the clutch body teeth 20, which amounts to a maximum of 1 degree, more particularly a maximum of 0.25 degrees. For currently commonly used diameters of the sliding sleeve 12 and the clutch body 14, this circumferential backlash, in radians, corresponds to a tangential clearance t≈0.2 mm.

In comparison with conventional synchronizer devices having pointed tooth ends, the convex end faces of the clutch body teeth 20 and/or of the meshing teeth 44 additionally allow the overall axial length of the synchronizer device 10 to be considerably reduced.

In the exemplary embodiment according to FIG. 4, the synchronizer device 10 includes a hub 58 and the synchronizer unit includes a thrust piece 26 for presynchronization, the hub 58 comprising a hub flange 60 and a hub web 62. The specifically illustrated thrust piece 26 here has a large radial dimension and extends from the hub flange 60 as far as into the hub web 62. It is, of course, also conceivable in connection with the present invention to employ a thrust piece 26 which has an especially compact design in the radial direction and is received exclusively in the hub flange 60 and does not extend into the hub web 62. Such a thrust piece 26 is disclosed in EP 1 715 210 B1, for example, and results in a lower weakening of the hub web 62 of the hub 58, so that the axial dimension of the hub web can be reduced. In this way, the use of a radially especially compact thrust piece 26 allows the overall axial length of the synchronizer device 10 to be still further decreased, if required.

Figure 13:
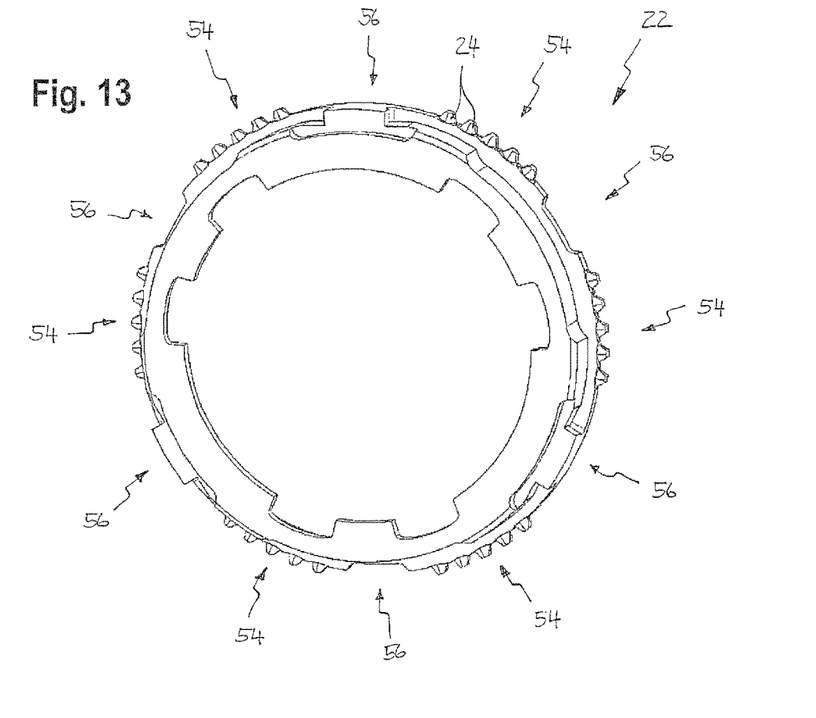
FIG. 13 shows a synchronizer ring of the synchronizer device according to FIG. 4.

FIG. 13 shows a perspective detail view of the synchronizer ring 22 of the synchronizer device 10 according to FIG. 4.

Viewed in the circumferential direction, the synchronizer ring 22 includes toothed ring segments 54 with synchronizer ring teeth 24 and toothless ring segments 56 without synchronizer ring teeth 24. According to FIG. 13, the toothless ring segments 56 are provided at places where so-called index tabs for defining a limited relative rotation of the synchronizer ring 22 or axial stops for limiting the shifting travel or recesses for axial stop elements 57 are integrally formed with the synchronizer ring 22.

In the assembled condition of the synchronizer device 10, the sliding sleeve 12 and the synchronizer ring 22 are oriented in relation to each other in the circumferential direction such that each locking tooth group 46 of the sliding sleeve 12 is arranged axially adjacent to a toothed ring segment 54 and each meshing tooth group 48 of the sliding sleeve 12 is arranged axially adjacent to a toothless ring segment 56 of the synchronizer ring 22 (see also FIG. 4).

FIGS. 14 to 17 illustrate a shifting process of the synchronizer device 10 and a synchronization method for shifting a transmission having such a synchronizer device 10. A respective developed detail view of the synchronizer device 10 in the region of a locking tooth group 46 of the sliding sleeve 12 and of an axially adjacent toothed ring segment 54 of the synchronizer ring 22 is illustrated on the left side, and a respective developed detail view of the synchronizer device 10 in the region of a meshing tooth group 48 of the sliding sleeve 12 and of an axially adjacent toothless ring segment 56 of the synchronizer ring 22 is illustrated on the right side.

Figure 14:
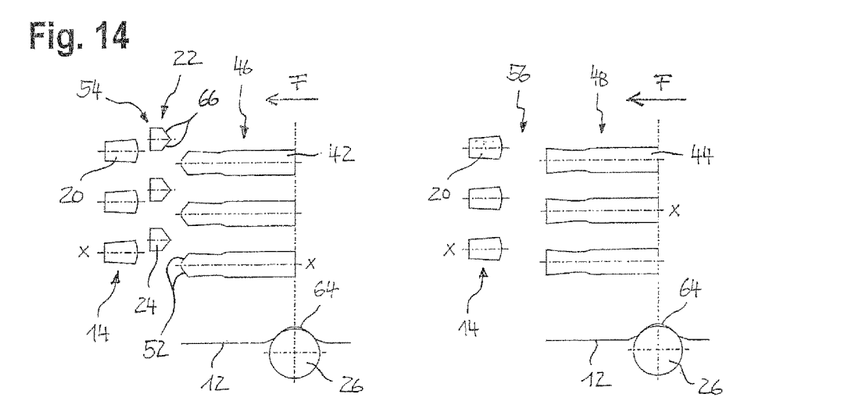
FIGS. 14 to 17 show schematic illustrations of a shifting operation in a synchronizer device according to the invention.
Figure 15:
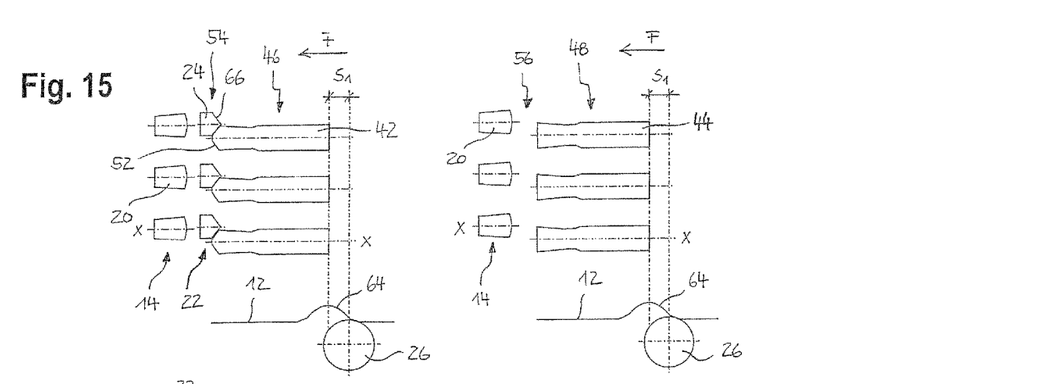

FIG. 14 shows a state prior to the start of the shifting process, in an axially central neutral position of the sliding sleeve 12. The axial tooth ends of the sliding sleeve teeth 18 are axially spaced apart both from the synchronizer ring teeth 24 and from the clutch body teeth 20.

As in a conventional synchronizer device 10', the sliding sleeve 12 rotates with the shaft, whereas the speed change gear to which the clutch body 14 is attached has a speed that is different from that of the sliding sleeve 12. The ball of the thrust piece 26 engages in a groove 64 on the inside of the sliding sleeve 12, as is indicated in the lower area of FIG. 14.

In the illustrated exemplary embodiment, the end faces of all clutch body teeth 20 have a convex shape, as already described above with reference to FIG. 7. To avoid a sharp-edged transition between the end faces and the tooth flanks 30, 36, any edges or corners existing in the region of the root points 28, 34 may be rounded or chamfered within the manufacturing tolerances.

All of the clutch body teeth 20 have the same length in the axial direction here and are, more particularly, designed to be identical.

The sliding sleeve teeth 18 also have the same length in the axial direction and are in the form of locking teeth 42, meshing teeth 44, or transition teeth 50, the locking teeth 42 each having an axial tooth end that is pointed on both sides in the circumferential direction. The meshing teeth 44 each have a blunt axial tooth end, the end faces of the blunt tooth ends more particularly being flat and extending perpendicularly to the transmission axis A in the present exemplary embodiment.

Alternatively, however, it is also conceivable that the end faces of the meshing teeth 44 are formed to be convex, as already described above with reference to FIG. 11. To avoid a sharp-edged transition between the end faces and the tooth flanks 30, 36, any edges or corners existing in the region of the root points 28, 34 may be rounded or chamfered within the manufacturing tolerances here as well.

In the neutral position shown in FIG. 14, a shifting travel S covered by the sliding sleeve 12 is still equal to 0. When the sliding sleeve 12 is axially displaced toward the clutch body 14 by an axial shifting force F, the pre-synchronizer unit acts on the synchronizer ring 22 and pushes it against a friction surface on the speed change gear side. In the process, the sliding sleeve 12 covers a shifting travel $S_1$ and the synchronizer ring 22 is moved to its locking position according to FIG. 15. In the locking position, the locking teeth 42 of the sliding sleeve 12 press on the synchronizer ring teeth 24, and the speed matching between the sliding sleeve 12 and the clutch body is effected. Once the speeds have been synchronized, a further axial displacement of the sliding sleeve 12 toward the clutch body 14 is possible, with the locking teeth 42 sliding into the spaces between the synchronizer ring teeth 24. This movement is assisted by inclined surfaces 66 on both sides of the synchronizer ring teeth 24, which are configured to be substantially parallel to the locking bevels 52 of the locking teeth 42 and can slide along them so as to guide the synchronizer ring teeth 24 into the tooth spaces between the locking teeth 42.

Figure 16:
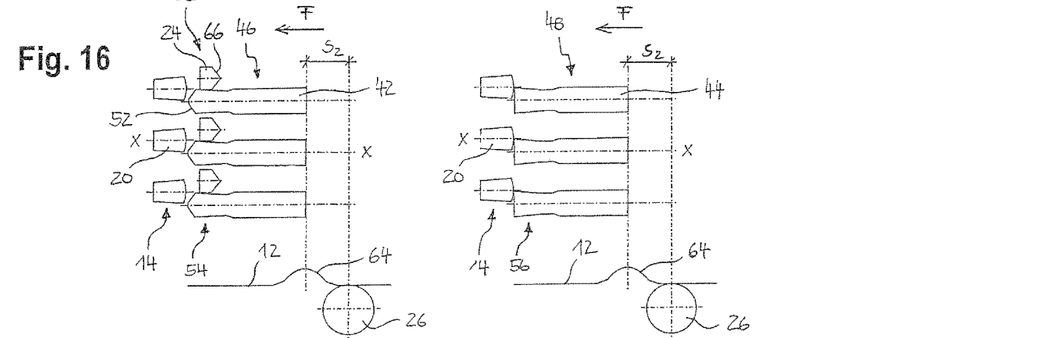

The synchronized state after the meshing of the internal toothing of the sliding sleeve 12 into the external toothing of the synchronizer ring 22 is illustrated in FIG. 16. The sliding sleeve 12 has now covered a shifting travel $S_2$, the groove 64 of the sliding sleeve 12 having slid over the ball of the thrust piece 26.

The meshing teeth 44 of the sliding sleeve 12 have no function during speed synchronization since the meshing tooth groups 48 axially adjoin toothless ring segments 56 of the synchronizer ring 22 and therefore do not cooperate with synchronizer ring teeth 24.

After the synchronization, however, according to FIG. 16 (right-hand side), the blunt tooth ends of the meshing teeth 44 and the convex end faces of the clutch body teeth 20 may directly meet, so that a meshing of the sliding sleeve teeth 18 between the clutch body teeth 20 is not possible. The sliding sleeve 12 is urged against the clutch body 14 by the axial shifting force F here.

In this case, a small differential speed between the sliding sleeve 12 and the clutch body 14 has to be built up again. The speed differential can be minimal since it is only required to generate an offset in the circumferential direction which makes sure that the end faces of the sliding sleeve teeth 18 meet the tooth spaces between the clutch body teeth 20.

In the present exemplary embodiment, the speed differential is established actively by taking at least one of the following measures:
  increasing a cooling oil flow within the transmission;
  initiating synchronization of a further speed change gear of the transmission which is not connected to the clutch body 14 for joint rotation therewith;
  driving a shaft brake of the transmission;
  driving an electric motor.

By an increase in the cooling oil flow, the drag torques are actively increased, so that a speed differential will be quickly reached.

A brief initiation of a synchronization of a speed change gear which, while not associated with the gear step to be shifted, is provided in the transmission, also allows a speed differential to be built up very quickly. The same is true for the driving of a shaft brake of the transmission, in which the speed is reduced by means of a frictional connection with a housing-fixed component.

The driving of the electric motor is of interest in particular in the case of hybrid vehicles, which are provided with an electric motor anyway. In this case, the internal combustion engine is decoupled from the transmission, and the electric motor is briefly connected for speed synchronization until the desired gear has been shifted. Subsequently, the electric motor may be decoupled again and the internal combustion engine may be connected to the transmission again.

For carrying out these measures, the manual transmission comprises the synchronizer device 10 and a transmission controller which includes a first actuator for axially displacing the sliding sleeve 12 and a second actuator for establishing a speed differential between the sliding sleeve 12 and the clutch body 14.

Owing to the speed differential between the sliding sleeve 12 and the clutch body 14, the end faces of the sliding sleeve teeth 18 and of the clutch body teeth 20 slide along each other circumferentially until the end faces of the sliding sleeve teeth 18, in particular of the meshing teeth 44, are axially adjacent to tooth spaces of the external toothing of the clutch body 14 and, based on the shifting force F, are able to engage between the clutch body teeth 20.

Figure 17:
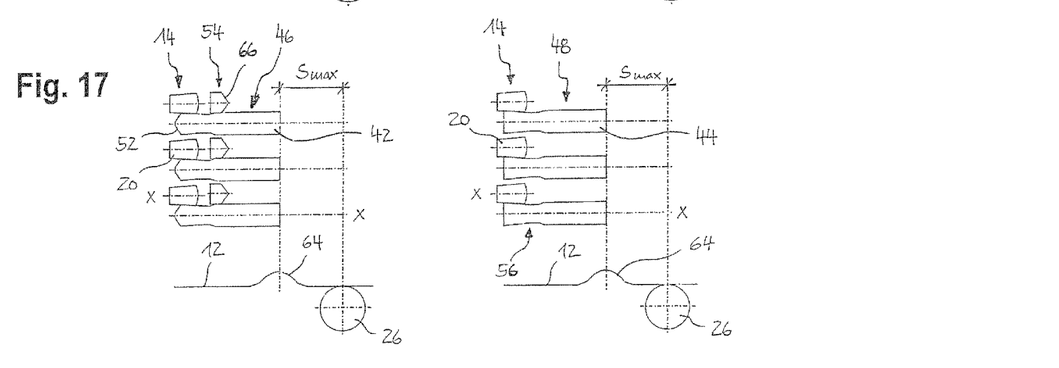

FIG. 17 shows the fully meshed condition, once the maximum shifting travel $S_{max}$ has been covered. The clutch body teeth 20 are now in their maximum insertion depth between the sliding sleeve teeth 18.

While the invention has been discussed on the basis of a specific exemplary embodiment of the synchronizer device 10 here, it should be appreciated that the basic idea of the present invention can also be readily transferred to other synchronization systems, as are described, for example, in EP 2 137 423 B1, WO 2011/054494 A1, WO 2012/028316 A1, or EP 0 812 398 B1.

In particular, it would also be conceivable to apply the present invention to synchronization systems in which the synchronizer device 10 is force-controlled and the synchronizer unit is therefore designed such that the blocking of the axial movement of the sliding sleeve 12 is overridden when a predetermined maximum force is exceeded.

The invention claimed is:

1. A synchronizer device for a manual transmission, comprising
 a sliding sleeve which includes an internal toothing having a multitude of sliding sleeve teeth and is rotatable about a transmission axis (A),
 a clutch body of a speed change gear, the clutch body having an external toothing having a multitude of clutch body teeth for the internal toothing of the sliding sleeve to engage therein, and
 a synchronizer unit which is adapted to block an axial movement of the sliding sleeve, wherein the synchronizer unit includes a synchronizer ring,
 wherein the clutch body teeth at axial tooth ends thereof adjacent to the sliding sleeve and/or at least some of the sliding sleeve teeth at axial tooth ends thereof adjacent to the clutch body each include one single convex end face or a plurality of convex end faces,
 wherein the single convex end face or the plurality of convex end faces each include an end face portion which extends perpendicularly to the transmission axis (A) or which has a tangent line extending perpendicularly to the transmission axis (A),
 wherein the single convex end face or one of the plurality of convex end faces each extends in the circumferential direction from a first root point directly adjacent to a tooth flank of the respective tooth via an axially protruding apex portion as far as to a second root point,
 the second root point adjoining an opposite tooth flank of the tooth when there is one single convex end face and the second root point being a valley point of an indentation between neighboring convex end faces when there is a plurality of convex end faces, and
 wherein an axial distance (a) between the apex portion and each of the root points amounts to a maximum of 18% of a tooth width (b) of the tooth.

2. The synchronizer device according to claim 1, wherein the axial distance (a) between the apex portion and each of the root points amounts to a maximum of 10% of the tooth width (b) of the tooth.

3. The synchronizer device according to claim 1, wherein the single convex end face, viewed in the radial direction, is formed to be mirror-symmetrical to an axial tooth centerline (X), and the plurality of convex end faces, viewed in the radial direction, are located in relation to each other so as to be mirror-symmetrical to the axial tooth centerline (X).

4. The synchronizer device according to claim 1, wherein the at least one convex end face is cylindrical.

5. The synchronizer device according to claim 1, wherein the at least one convex end face, viewed in the radial direction, is formed by a portion of a lateral surface of a circular cylinder from root point to root point.

6. The synchronizer device according to claim 1, wherein an axial dimension of the clutch body teeth amounts to a maximum of 3 mm.

7. The synchronizer device according to claim 1, wherein a circumferential backlash between the sliding sleeve and the clutch body amounts to a maximum of 1 degree.

8. The synchronizer device according to claim 1, wherein at least some of the sliding sleeve teeth, at the tooth ends thereof adjacent to the clutch body, include an end face which is flat and extends perpendicularly to the transmission axis (A).

9. The synchronizer device according to claim 1, wherein the synchronizer device is force-controlled, the synchronizer unit being formed such that the blocking of the axial movement of the sliding sleeve is overridden when a predetermined maximum force is exceeded.

10. The synchronizer device according to claim 1, wherein the synchronizer ring has an external toothing with a multitude of synchronizer ring teeth,
 wherein the internal toothing of the sliding sleeve includes locking teeth each having an axial tooth end that is pointed on both sides in the circumferential direction and meshing teeth each having a blunt axial tooth end, and
 wherein locking tooth groups of a plurality of locking teeth that are directly adjacent to each other in the circumferential direction and meshing tooth groups of a plurality of meshing teeth that are directly adjacent to each other in the circumferential direction alternate in the circumferential direction.

11. The synchronizer device according to claim 10, wherein the synchronizer ring includes, in the circumferential direction, toothed ring segments having synchronizer ring teeth and toothless ring segments without synchronizer ring teeth, each locking tooth group of the sliding sleeve being arranged axially adjacent to a toothed ring segment and each meshing tooth group of the sliding sleeve being arranged axially adjacent to a toothless ring segment.

12. The synchronizer device according to claim 10, wherein the tooth ends of the locking teeth and the tooth ends of the meshing teeth lie substantially in a common plane (E) which extends perpendicularly to the transmission axis (A).

13. The synchronizer device according to claim 10, wherein the blunt tooth ends of the meshing teeth include either an end face which is flat and extends perpendicularly to the transmission axis (A) or one single or a plurality of convex end faces, the single convex end face or one of the plurality of convex end faces each extending in the circumferential direction from a first root point adjacent to a tooth flank of the sliding sleeve tooth via an axially protruding apex portion as far as to a second root point, the second root point adjoining an opposite tooth flank of the tooth when there is one single convex end face and being a valley point of an indentation between neighboring convex end faces when there is a plurality of convex end faces, and an axial distance (a) between the apex portion and each of the root points amounting to a maximum of 18% of a tooth width (b) of the sliding sleeve tooth.

14. The synchronizer device according to claim 10, wherein the axial tooth ends of the locking teeth that are pointed on both sides in the circumferential direction include locking bevels which include an angle ($\alpha$) with the transmission axis (A) that amounts to a maximum of 70 degrees.

15. The synchronizer device according to claim 10, wherein the internal toothing of the sliding sleeve includes a respective transition tooth between the locking tooth groups and the meshing tooth groups in the circumferential direction, an axial tooth end of each transition tooth being divided approximately in the middle in the circumferential direction and geometrically corresponding to the tooth end of a locking tooth on the side adjacent to the locking tooth group and to the tooth end of a meshing tooth on the side adjacent to the meshing tooth group.

16. A synchronization method for shifting a transmission having a synchronizer device according to claim 1, comprising the method steps of:
(a) providing a first actuator for axially displacing the sliding sleeve and a second actuator for establishing a speed differential between the sliding sleeve and the clutch body,
(b) matching the speeds of the sliding sleeve and of the clutch body by the synchronizer device;
(c) building up an axial force (F) of the sliding sleeve toward the clutch body;
(d) subsequently establishing a speed differential between the sliding sleeve and the clutch body so that the end faces of the sliding sleeve teeth and of the clutch body teeth slide circumferentially along each other, the speed differential being established by at least one of the following measures:
  increasing a cooling oil flow within the transmission;
  initiating synchronization of a further speed change gear of the transmission which is not connected to the clutch body for joint rotation therewith;
  driving a shaft brake of the transmission;
  driving an electric motor;
(e) causing the sliding sleeve teeth to engage between the clutch body teeth.

17. A synchronizer device for a manual transmission, comprising
a sliding sleeve which includes an internal toothing having a multitude of sliding sleeve teeth and is rotatable about a transmission axis (A),
a clutch body of a speed change gear, the clutch body having an external toothing having a multitude of clutch body teeth for the internal toothing of the sliding sleeve to engage therein, and
a synchronizer unit including a synchronizer ring which has an external toothing having a multitude of synchronizer ring teeth and is adapted to block an axial movement of the sliding sleeve,
wherein the internal toothing of the sliding sleeve includes locking teeth each having an axial tooth end that is pointed on both sides in the circumferential direction and meshing teeth each having a blunt axial tooth end,
wherein the blunt tooth ends of the meshing teeth include one single or a plurality of convex end faces, the single convex end face or one of the plurality of convex end faces each extending in the circumferential direction from a first root point adjacent to a tooth flank of the sliding sleeve tooth via an axially protruding apex portion as far as to a second root point, the second root point adjoining an opposite tooth flank of the tooth when there is one single convex end face and being a valley point of an indentation between neighboring convex end faces when there is a plurality of convex end faces, and an axial distance (a) between the apex portion and each of the root points amounting to a maximum of 18% of a tooth width (b) of the sliding sleeve tooth,
wherein the single convex end face or the plurality of convex end faces each include an end face portion which extends perpendicularly to the transmission axis (A) or which has a tangent line extending perpendicularly to the transmission axis (A), and
wherein locking tooth groups of a plurality of locking teeth that are directly adjacent to each other in the circumferential direction and meshing tooth groups of a plurality of meshing teeth that are directly adjacent to each other in the circumferential direction alternate in the circumferential direction.

18. The synchronizer device according to claim 17, wherein the synchronizer ring includes, in the circumferential direction, toothed ring segments having synchronizer ring teeth and toothless ring segments without synchronizer ring teeth, each locking tooth group of the sliding sleeve being arranged axially adjacent to a toothed ring segment and each meshing tooth group of the sliding sleeve being arranged axially adjacent to a toothless ring segment.

19. The synchronizer device according to claim 17, wherein the tooth ends of the locking teeth and the tooth ends of the meshing teeth lie substantially in a common plane (E) which extends perpendicularly to the transmission axis (A).

20. The synchronizer device according to claim 17, wherein the axial tooth ends of the locking teeth that are pointed on both sides in the circumferential direction include locking bevels which include an angle ($\alpha$) with the transmission axis (A) that amounts to a maximum of 70 degrees.

21. The synchronizer device according to claim 17, wherein the internal toothing of the sliding sleeve includes a respective transition tooth between the locking tooth groups and the meshing tooth groups in the circumferential direction, an axial tooth end of each transition tooth being divided approximately in the middle in the circumferential direction and geometrically corresponding to the tooth end of a locking tooth on the side adjacent to the locking tooth group and to the tooth end of a meshing tooth on the side adjacent to the meshing tooth group.

* * * * *